United States Patent
Wang et al.

(10) Patent No.: US 7,477,319 B2
(45) Date of Patent: Jan. 13, 2009

(54) SYSTEMS AND METHODS FOR DEINTERLACING VIDEO SIGNALS

(75) Inventors: Hsi-Chen Wang, San Jose, CA (US); Shi-Chang Wang, Sunnyvale, CA (US)

(73) Assignee: LSI Corporation, Milpitas, CA (US)

( * ) Notice: Subject to any disclaimer, the term of this patent is extended or adjusted under 35 U.S.C. 154(b) by 616 days.

(21) Appl. No.: 11/156,128

(22) Filed: Jun. 17, 2005

(65) Prior Publication Data
US 2006/0285010 A1 Dec. 21, 2006

(51) Int. Cl.
*H04N 11/00* (2006.01)
*H04N 7/01* (2006.01)

(52) U.S. Cl. ...................... 348/452; 348/448

(58) Field of Classification Search ........... 348/448, 348/452, 459, 581, 701; 345/660–667; 382/298–300
See application file for complete search history.

(56) References Cited

U.S. PATENT DOCUMENTS

| | | | | |
|---|---|---|---|---|
| 4,334,244 A | * | 6/1982 | Chan et al. | 348/606 |
| 4,682,230 A | * | 7/1987 | Perlman et al. | 348/616 |
| 5,488,421 A | * | 1/1996 | Hwang et al. | 348/448 |
| 6,133,957 A | * | 10/2000 | Campbell | 348/458 |
| 6,452,639 B1 | * | 9/2002 | Wagner et al. | 348/448 |
| 6,731,342 B2 | * | 5/2004 | Shin et al. | 348/452 |
| 6,839,094 B2 | * | 1/2005 | Tang et al. | 348/607 |
| 6,970,206 B1 | * | 11/2005 | Swan et al. | 348/448 |
| 7,079,190 B2 | * | 7/2006 | Chow | 348/448 |
| 2002/0044293 A1 | * | 4/2002 | Fukasawa | 358/1.9 |
| 2004/0012720 A1 | * | 1/2004 | Alvarez | 348/607 |
| 2005/0275753 A1 | * | 12/2005 | Jung | 348/448 |

\* cited by examiner

*Primary Examiner*—Victor R Kostak
(74) *Attorney, Agent, or Firm*—Christopher P. Maiorana, PC

(57) ABSTRACT

A method for rendering an object on a display screen, comprising the steps of (A) buffering a plurality of pixels in a plurality of line buffers, (B) determining a boundary of the object based on the buffered pixels, (C) determining a direction of the boundary, (D) testing if a pixel in the line buffers is in motion and applying one of a plurality of filter coefficients if the pixel is in motion, where the plurality of filter coefficients define a modified median filter having a predetermined threshold and (E) interpolating a new pixel in the direction of the boundary.

20 Claims, 7 Drawing Sheets

MEDIAN FILTERING (A<P<B) || (A>P>B)

A AND B ARE NEIGHBORING PIXELS IN EITHER
VERTICAL OR HORIZONTAL DIRECTION.
P IS THE NEW GENERATED PIXEL.

MODIFIED MEDIAN FILTERING ( (A-TH)<P<(B+TH)) ||
((A+TH)>P>(B-TH))

A AND B ARE NEIGHBORING PIXELS IN EITHER
VERTICAL OR HORIZONTAL DIRECTION.
P IS THE NEW GENERATED PIXEL.
TH IS THE PREDETERMINED THRESHOLD.

SYSTEMS AND METHODS FOR DEINTERLACING VIDEO SIGNALS

FIELD OF THE INVENTION

The present invention relates to a video processing generally and, more particularly, to systems and methods for deinterlacing video signals for digital display devices such as liquid crystal displays, plasma displays and progressive-scan televisions.

BACKGROUND OF THE INVENTION

Displaying video content originally created for television on a computer display is a desired feature for a multi-media computer system. However, television video signals and the computer video differ in formats. For example, many television and video signals are interlaced, where a set of scan lines of a single video frame are not scanned or transmitted sequentially. A typical U.S. NTSC (National Television System Committee) television signal uses two fields for each frame. Each field contains video data for every other horizontal line of the entire frame. Consecutive scans of the two fields occur 30 times per second. The scan lines for one field are transmitted first, followed by the scan lines of the second field. The viewer perceives the resulting image (or frame) as a blend of the two individual fields with an effective refresh rate of 60 Hz. The interlaced format reduces flicker without doubling of the data transfer rate which would be needed to update the entire frame at 60 Hz.

In contrast, computer monitors are not interlaced. Computer monitors sequentially scan the entire display area, one scan line after another (typically referred to as progressive scan). To display an interlaced scanned sequence, such as a video signal, on such progressively scanned devices, a deinterlacing process converts each separate field into a complete display frame that can be sequentially presented to the display device. The main task of a de-interlacing process is to reconstruct the missing line between each of the scan lines of an interlaced field. An entire frame is scanned line-by-line, typically from top to bottom. The process repeats and re-scans the entire frame at a given refresh rate, for example, 60 Hz.

There are two primary conventional de-interlacing methods, each with their own strengths and weaknesses. "Interfield" techniques simply merge the data from the second field with the data from the first field to produce a completed frame. If there is no motion in the video frame, such methods yield an ideal reconstituted picture. Vertical resolution can be as good as an original noninterlaced frame. However, if there is motion within the video signal, motion effects will generally be visible to the human eye. Motion effects arise when an object, which was in one location during the scanning of the first field, has moved when the alternating scan lines of the second field are scanned. Simply combining the interlaced scan lines of the two fields yields an unacceptable rendition of the object.

"Intra-field" techniques use data only from a single field to produce a complete frame. Such methods are better suited for video frames having motion. With an intra-field technique, the values for non-existent pixels are interpolated from pixel values in the scan lines above and below the non-existent pixels. The intra-field technique produces no deleterious motion effect, since motion is not incorporated from one field to the next. However, the intra-field technique also does not enhance vertical resolution, since the intra-field technique merely interpolates from existing pixel values within a single field and does not use pixel information for missing scan lines from the second field. Also, simple intra-field deinterlacing techniques (such as simple vertical interpolation) tend to generate unacceptable jagged pictures along diagonal edges.

U.S. Pat. No. 6,421,090 to Jiang, et al. entitled "Motion and edge adaptive deinterlacing" shows a method for interpolating a pixel during the deinterlacing of a video signal, the video signal including at least two fields of interlaced scan lines, each scan line including a series of pixels having respective intensity values. This method includes generating a motion value representative of the motion between successive frames about the pixel, detecting an edge direction about the pixel, performing an edge adaptive interpolation at the pixel, using the detected edge direction, and performing a motion adaptive interpolation at the pixel, using the generated motion value. The corresponding apparatus for interpolating a pixel during the deinterlacing of a video signal includes a motion value generator configured to generate a motion value representative of the motion between successive frames about the pixel, an edge direction detector configured to detect an edge direction about the pixel, an edge adaptive interpolator configured to perform an edge adaptive interpolation at the pixel, using the detected edge direction, and a motion adaptive interpolator configured to perform a motion adaptive interpolation at the pixel, using the generated motion value.

U.S. Pat. No. 6,459,455 to Jiang, et al. entitled "Motion adaptive deinterlacing" relates to a method and apparatus for deinterlacing video frames. The method and apparatus for deinterlacing video frames selects a location for deinterlacing and measures motion at that location. A deinterlacing method is selected based on the measured motion and a pixel value is created for the location.

SUMMARY OF THE INVENTION

The present invention concerns a method for rendering an object on a display screen, comprising the steps of (A) buffering a plurality of pixels in a plurality of line buffers, (B) determining a boundary of the object based on the buffered pixels, (C) determining a direction of the boundary, (D) testing if a pixel in the line buffers is in motion and applying one of a plurality of filter coefficients if the pixel is in motion, where the plurality of filter coefficients define a modified median filter having a predetermined threshold and (E) interpolating a new pixel in the direction of the boundary.

Systems and methods are disclosed for de-interlacing video signals. The system includes a horizontal scaler to horizontally scale the video data, a de-interlacer coupled to the horizontal scaler, and a vertical scaler coupled to the de-interlacer.

Particular advantages obtained from the present invention are due to the substantially reduced number of operations to be performed in converting the interlaced image fields into non-interlaced image frames. Performing these operations on a reduced number of pixels reduces the operations. The present invention greatly simplifies the operations implemented. The invention may also provide an integrated vertical scaling, as well as motion and edge adaptive de-interlacing capability. The system may render boundary graphics with high quality. Edge artifacts may be reduced or minimized. Additionally, the resulting system takes less space than conventional systems, resulting in cost reduction and yield improvements. Further, the present invention may be implemented without an external video memory. Hence, the system cost-effectively deinterlaces input video to provide a sharp image on screen.

In one example, the present invention may combine 1) vertical scaling (or interpolation/decimation), 2) motion edge adaptive interlacing and 3) filtering. In another example, the present invention also provides both 2-dimensional and 3-dimensional de-interlacing on a small die size.

Additional features and advantages of the invention will be set forth in the description, which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 1:
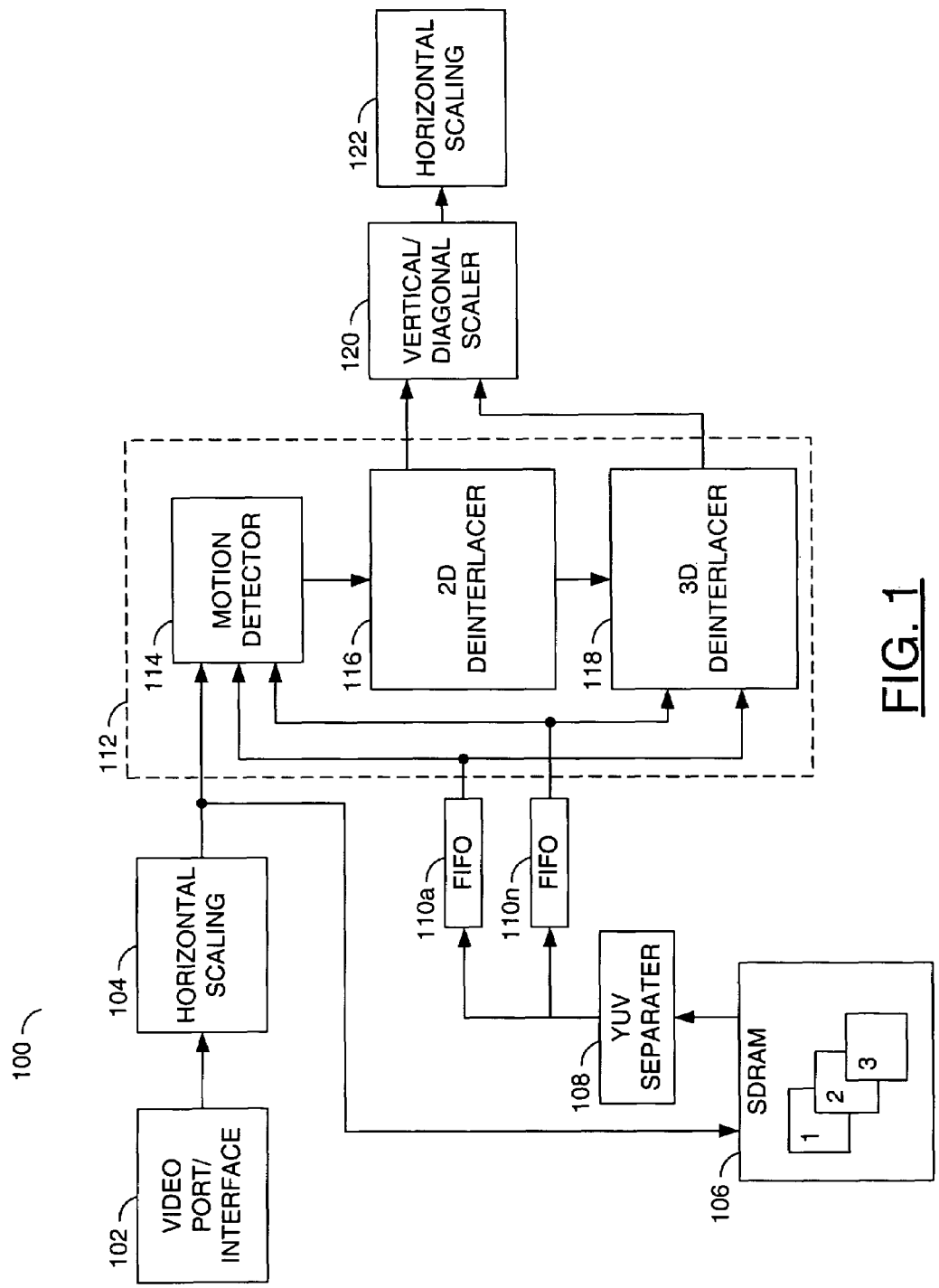
FIG. 1 shows an exemplary video deinterlacing system.

Referring now to the drawings in greater detail, there is illustrated therein structure diagrams for a display system and logic flow diagrams for processes a computer system may utilize to render images on a display panel, as will be readily understood by an artisan skilled in the field of the present invention from a study of the diagrams.

Referring to FIG. 1, a block diagram of a system 100 is shown illustrating an exemplary video deinterlacing system in which one or more preferred embodiments of the present invention may be implemented. In this exemplary configuration, video data may be presented to a port 102. The port 102 may be configured to send the video data to a horizontal scaling unit 104. The horizontal scaling unit 104 may be configured to scale the video data according to a predetermined factor in a first mode and pass the video data unscaled in a second mode. In one example, the horizontal scaling unit 104 may be configured to pass the video data directly from the input of the horizontal scaling unit 104 to the output of the horizontal scaling unit 104 when in the second mode. In another example, the horizontal scaling unit may be configured to set the predetermined factor for scaling the video data to one (e.g., a 1:1 scaling ratio) when in the second mode. The horizontal scaling unit 104 may present the video data to a video memory 106.

In one example, the memory 106 may be implemented as a synchronous dynamic random access memory (SDRAM). In one example, the video data may be in YUV format. However, other formats (e.g., RGB, YCbCr, etc.) may be implemented accordingly to meet the design criteria of a particular implementation. The video data stored in video memory 106 may be extracted using a YUV separator 108. The YUV separator 108 may be configured to present extracted data to a number of buffers 110a-n. For example, luminance and chrominance data may be stored in different (or separate) buffers. The buffers 110a-110n may be implemented, in one example, as first-in first-out (FIFO) memories.

Video data from the horizontal scaling block 104 and the buffers 110a-110n may be presented to a deinterlacing system 112. In one example, the deinterlacing system 112 may be implemented as a motion adaptive de-interlacing engine. The deinterlacing system 112 may comprise, in one example, a motion detector block 114, a 2D deinterlacer 116 and a 3D deinterlacer 118. The motion detector block 114 may be configured to perform adaptive motion and/or edge detection. In general, motion detection and/or edge detection may be performed using extracted luminance data. The motion detector block 114 may have a first input that may receive video data from the horizontal scaling unit 104, a second input that may receive video data from the buffers 110a-110n and an output that may present information regarding detected motion (e.g., motion vectors, etc.) to an input of the 2D deinterlacer 116. The motion detector block 114 may be further configured to pass the video data received from the horizontal scaling unit 104 to the 2D deinterlacer 116 and the 3D deinterlacer 118.

The 2D (or intra-frame) de-interlacer 116 may be configured to process intra-frame data. The 3D (or inter-frame) de-interlacer 118 may be configured to process inter-frame data. The 2D de-interlacer 116 may have a first output that may present a signal to a first input of the 3D de-interlacer 118 and a second output that may present a signal to a first input of a vertical/diagonal scaler block 120. The 3D deinterlacer 118 may have an output that may present a signal to a second input of the vertical/diagonal scaler block 120 and a number of second inputs that may receive inter-frame data from the buffers 110a-n.

The output of the motion detector 114 may be used to detect whether pixels are in motion and apply one of a plurality of filter coefficients to the moving pixels. The horizontal scaler 104 horizontally scales the video data. The 2D de-interlacer 116 and the 3D de-interlacer 118 may be coupled to the horizontal scaler 104. The 2D de-interlacer 116 and the 3D de-interlacer 118 may be coupled to the vertical/diagonal scaler block 120. The vertical/diagonal scaler block 120 may have an output that may present a signal comprising de-interlaced and vertically scaled pixels to an input of a horizontal scaling block 122. The horizontal scaling block 122 may be implemented, in one example, as a horizontal scaling engine.

In the deinterlacing application, the vertical/diagonal scaler (or interpolation/decimation engine) 120 may be configured to perform vertical de-interlacing filtering. After adaptive motion and/or edge detection and de-interlacing have been performed, the de-interlaced video frame may be processed by the horizontal scaling engine 122 to meet predetermined output specifications. In general, edge effect processing should be performed prior to processing by the horizontal interpolation engine 122. In one example, edge detection may be performed using a technique described in a co-pending application U.S. Ser. No. 10/385,087, filed Mar. 9, 2003, which is herein incorporated by reference in its entirety.

In a 2D-deinterlacing mode, the system 100 generally operates in an intra-frame mode. In the intra-frame mode, a process is performed to generate extra frame pixels from the pixels within a frame. The extra frame pixels generally reduce artifacts and blocky effects. Reducing artifacts and blocky effects generally makes the video appear smoother. In the 2D-deinterlacing (or intra-frame) mode, the external SDRAM 106 is generally not used to store frames.

In a 3D-deinterlacing mode, the external memory 106 may be adapted to store (i) a previous frame, (ii) a frame after a current frame being processed and (iii) the current three frames. Based on the stored frames, the motion detection engine 114 may be configured (i) to detect whether or not the picture contains motion and (ii) to generate motion vectors when motion is present. Based on the motion vectors, current output frames may be generated by the motion adaptive de-interlacing engine 112. If the picture is not moving (e.g., still or almost still), the motion vectors are generally very small. When the motion vectors are very small, the 3D de-interlacer 118 of the motion adaptive de-interlacing engine 112 may be configured to switch to reference pixel data from the 2D de-interlacer engine 116.

While FIG. 1 and the corresponding discussion above provide a general description of a suitable environment in which the present invention may be implemented, the features of the present invention disclosed herein may be practiced in association with a variety of different system configurations. For example, the invention may be implemented in software, hardware or any combination thereof, whether now existing or to be developed in the future that is able to implement the principles of the present invention. Examples of suitable operating environments that may be adapted to implement the principles of the present invention include general purpose computers, special purpose computers, set top boxes, or the like.

Figure 2:
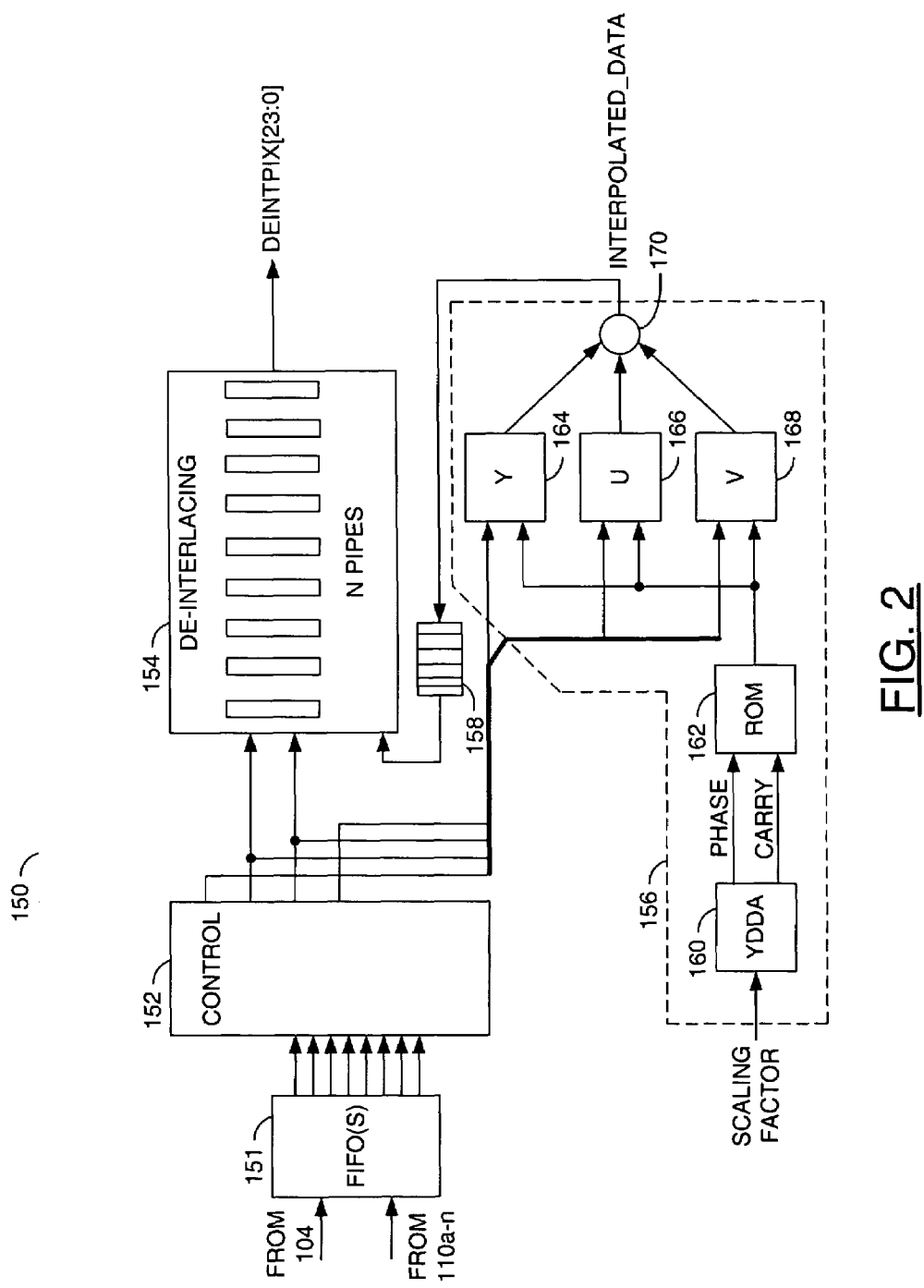
FIG. 2 shows a graphics engine with integrated vertical scaling as well as motion and edge adaptive de-interlacing capability.

Referring to FIG. 2, a block diagram of a circuit 150 is shown. The circuit (or block) 150 may be implemented as a graphics engine with integrated vertical scaling, as well as motion and edge adaptive de-interlacing capability. For example, the circuit 150 may be configured to combine (or integrate) the operations performed by the de-interlacing system 112 and vertical/diagonal scaler 120 in FIG. 1. In one example, the circuit 150 may comprise a block (or circuit) 151, a block (or circuit) 152, a block (or circuit) 154, a block (or circuit) 156 and a block (or circuit) 158. The block 151 may be implemented, in one example, as one or more first-in first-out (FIFO) buffers. In one example, the block 151 may be configured to couple the circuit 150 to prior stages (e.g., the horizontal scaling block 104 and buffers 110a-110n). In another example, the block 151 may be configured to include the buffers 110a-110n.

The block 152 may be implemented, in one example, as a control circuit. The block 154 may be implemented as a de-interlacing circuit. In one example, the block 154 may comprise a 2D de-interlacing unit. In one example, the block 154 may be implemented as a pipelined system with N stages, where N is an integer. In one example, the number of stages implemented may be 8. In another example, the number of stages implemented may be 30. In general, the number of stages implemented may be balanced with system cost. For example, the more stages implemented the better the edge detection and diagonal scaling. However, increasing the number of stages generally increases the die size and cost. The block 156 may be implemented as a vertical scaler circuit. The block 158 may be implemented as a buffer. In one example, the block 158 may comprise a first-in first-out (FIFO) memory.

In one example, the circuit 152 may have a number of inputs that may receive signals from the FIFOs 151 and a number of outputs that may present signals to (i) a number of first inputs of the block 154 and (ii) an input of the block 156. For example, a first portion of the signals from the block 152 may be presented to the one or more first inputs of the block 154 and an input of the block 156. A second portion of the signals from the block 152 may be presented only to the block 156. The block 154 may have a second input that may receive a signal from an output of the block 158 and an output that may present a signal (e.g., DEINTPIX). In one example, the signal DEINTPIX may comprise de-interlaced and vertically scaled pixels. In one example, the de-interlaced and scaled pixels may be 24 bits wide (e.g., DEINTPIX[23:0]).

The block 156 may have an output that may present a signal (e.g., INTERPOLATED_DATA). The signal INTERPOLATED_DATA may comprise vertically scaled (or interpolated) data. The signal INTERPOLATED_DATA may be presented to an input of the circuit 158. The block 156 may comprise a block (or circuit) 160, a block (or circuit) 162, a block (or circuit) 164, a block (or circuit) 166, a block (or circuit) 168 and a block (or circuit) 170. The block 160 may be implemented as a luma digital differential analyzer (Y-DDA). The block 160 may be configured to control the amount of vertical scaling provided by the block 156. In one example, the block 160 may be programmable. For example, the block 160 may have an input that may receive a signal (e.g., SCALING FACTOR). The signal SCALING FACTOR may be used to control the amount of vertical scaling. The block 162 may be implemented as a read only memory (ROM). The blocks 164-168 may be implemented as digital filters. The block 170 may be implemented as a combiner circuit configured to combine an output from each of the blocks 164-168 for presentation as the signal INTERPOLATED_DATA.

In one implementation, the block 160 may be implemented as a 19-bit counter clocked by a synchronization signal (e.g., VSYNC). The block 160 may have a first output that may present a signal (e.g., PHASE) to a first input of the block 162 and a second output that may present a signal (e.g., CARRY) to a second input of the block 162. The signal PHASE may comprise phase data. The signal CARRY may comprise a carry bit. The block 162 may have an output that may present a signal to a first input of each of the blocks 164-168. Each of the blocks 164-168 may have a second input that may receive one or more of the signals received from the block 152 and an output that may present a signal to a respective input of the block 170.

In one example, the blocks 164-168 may be implemented as digital filters for Y, U and V video data, respectively. In another example, the blocks 164-168 may be implemented accordingly as digital filters for red, green and blue (RGB) or Y, Cb and Cr video data. The blocks 164-168 may be implemented as low-pass filters configured to reduce high frequency noise. The outputs of the blocks 164-168 may be bussed together and presented to the buffer 158. Video data queued in the buffer 158 may be presented as inputs to the block 154.

Figure 3:
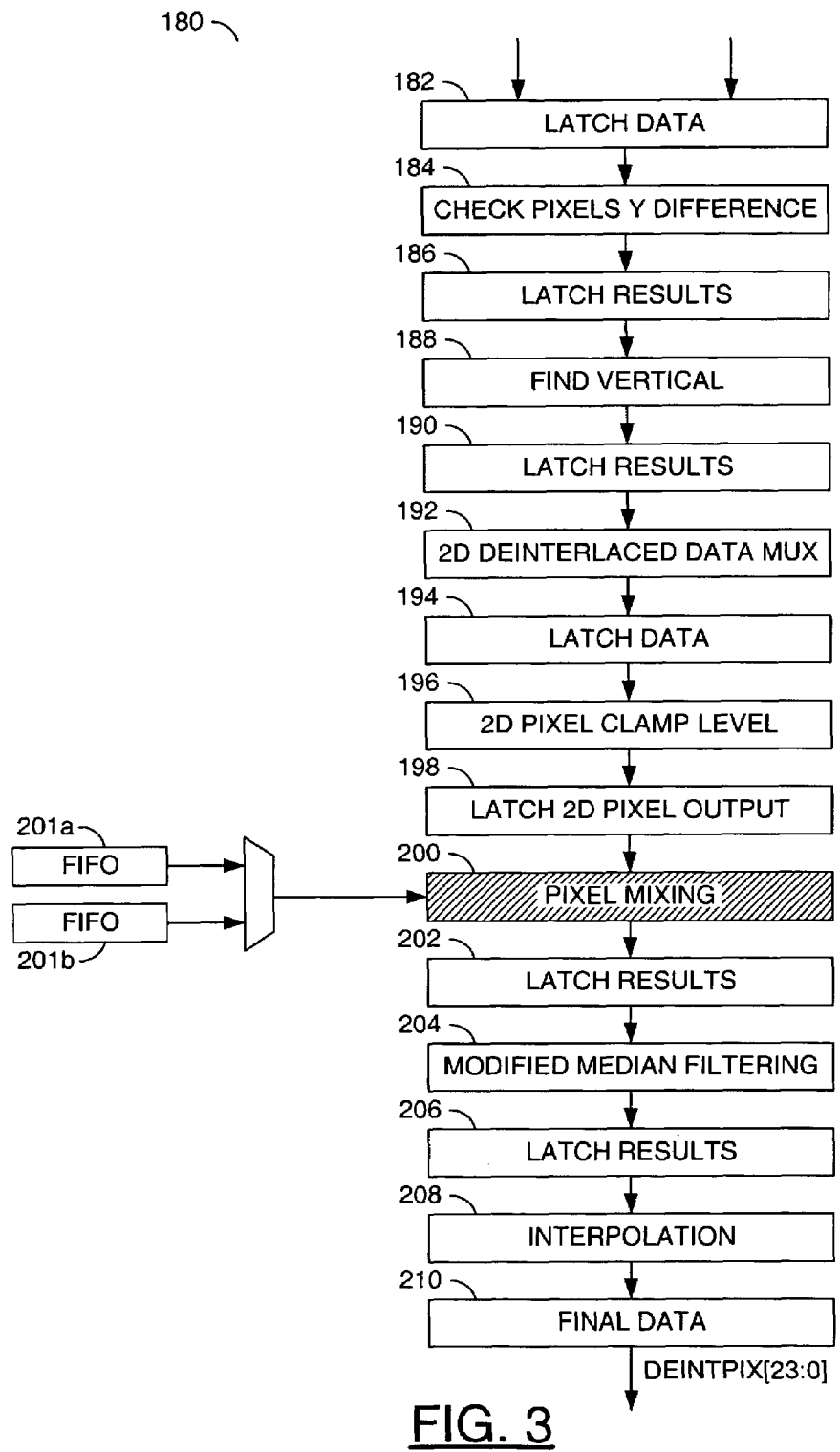
FIG. 3 illustrates an exemplary operation of the de-interlacing unit.

Referring to FIG. 3, a flow diagram 180 is shown illustrating an example de-interlacing operation of the block 154 of FIG. 2. In one example, the process 180 may be implemented as a pipelined process to increase throughput. In one example, incoming data to the process 180 may be latched into a first pipeline stage (e.g., block 182). The block 154 may be configured to check for Y value differences among pixels in two video lines (e.g., block 184). The result of checking for Y value differences among pixels in two video lines may be latched in a second pipeline stage (e.g., block 186). The block 154 may be configured to detect edge differences. For example, the block 154 may determine a minimum value of all edge differences (e.g., block 188), and latch the result in a third pipeline stage (e.g., block 190). If the minimum edge difference value cannot be ascertained, data from the block 156 (e.g. INTERPOLATED_DATA) may be selected as the new pixel data through a multiplexer (e.g., block 192), and the result latched in a fourth pipeline stage (e.g., block 194).

The process 180 may continue by comparing the video data latched in the fourth pipeline stage against a predetermined threshold (e.g., block 196). In one example, the threshold may be implemented as a 2D pixel clamp level. The thresholding operation 196 may be configured to reduce or eliminate high frequency noise or artifacts in the video data. The result of the thresholding operation 196 may be latched in a fifth pipeline stage (e.g., block 198). Next, a 3D thresholding (or pixel mixing) operation may be performed by comparing the latched values from the fifth pipeline stage with values for pixels in the same pixel location from a corresponding two lines in the previous frame (e.g., block 200). The pixel mixing operation 200 may comprise multiplexing 2D (intra-frame) data and 3D (inter-frame) data. For example, the two corresponding lines from the previous frame may be obtained (e.g., via a multiplexer) from one of two buffers (e.g., FIFOs 201*a* and 201*b*). In one example, the FIFOs 210*a* and 210*b* may correspond to the FIFOs 110*a*-110*n* in FIG. 1. The result of the 3D thresholding operation (e.g., selection of either the 2D interlacing result or the 3D interlacing result) may be latched in a sixth pipeline stage (e.g., block 202).

The process 180 may continue by performing another thresholding operation (e.g., block 204). In one example, the thresholding operation 204 may comprise a modified median filtering operation (described in more detail in connection with FIG. 7 below). A result of the thresholding operation 204 may be latched in a seventh pipeline stage (e.g., block 206). A linear interpolation may be performed to select one position from the total number of phases generated by the YDDA 160 (e.g., block 208). The YDDA 160 generally selects one set of data from a plurality of coefficient sets. A result of the linear interpolation is then latched in an eighth pipeline stage (e.g., block 210). The latched output may be presented to a display panel interface (e.g., as the signal DEINTPIX[23:0]). In general, the present invention may integrate (i) vertical scaling (e.g., interpolation/decimation), (ii) motion and/or edge adaptive interlacing and (iii) filtering into a combined operation.

Figure 4:
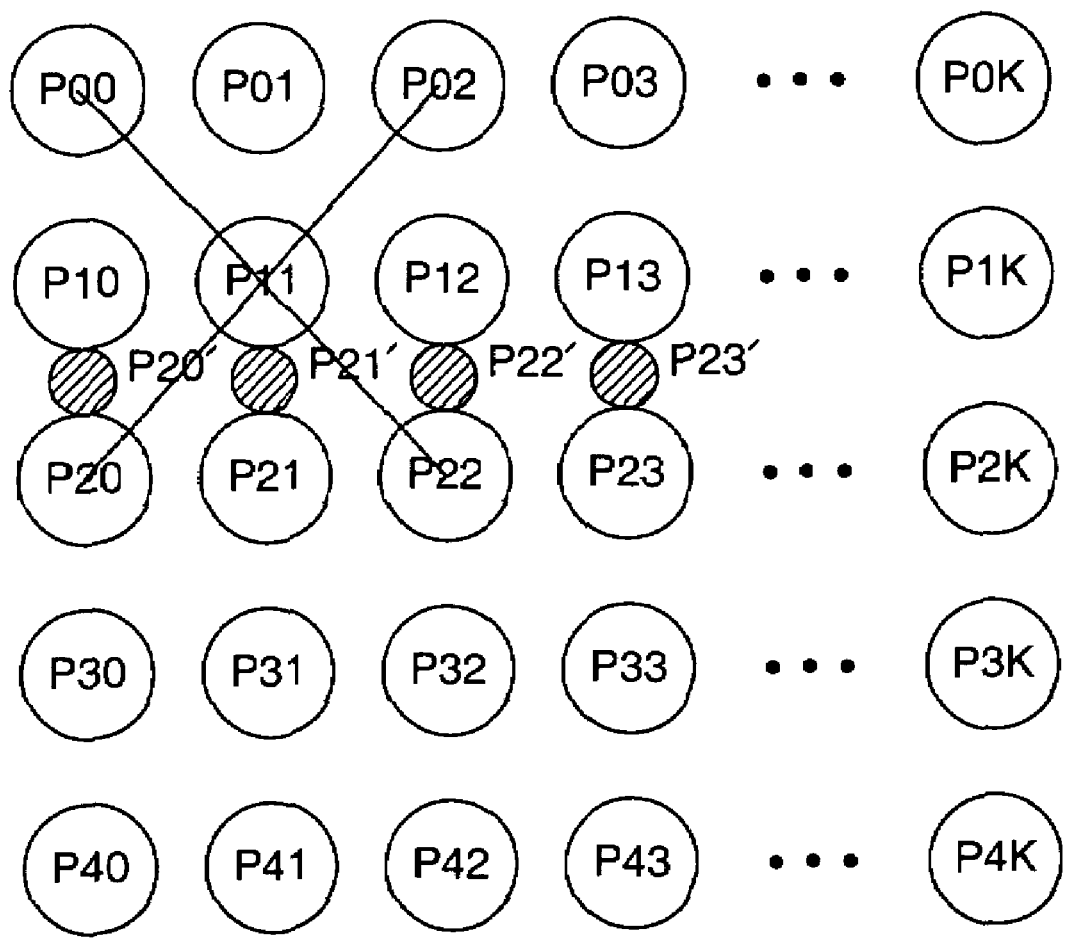
FIG. 4 shows an exemplary diagram illustrating operation of an interpolation decimation engine.

Referring to FIG. 4, an exemplary diagram is shown illustrating an example vertical/diagonal interpolation/decimation operation. The vertical/diagonal interpolation/decimation operation may be performed by the vertical/diagonal scaler 120 in FIG. 1 or the block 154 in FIG. 2. The vertical/diagonal interpolation/decimation process may involve manipulating image data two-dimensionally such that diagonal image data is also considered to avoid jagged edges. Although conventional X-Y or Y-X interpolation engines may be used, a vertical/diagonal interpolation/decimation engine (e.g., the vertical/diagonal scaler 120) is generally superior to engines that only consider X-Y or Y-X interpolation in image quality.

In general, vertical/diagonal interpolation/decimation may be performed using an array of rows of pixels is shown. For example, in a first row, the pixels include P00, P01, P02, P03, . . . P0*k*. Correspondingly, in a second row, the pixels include P10, P11, P12, P13, . . . P1*k*; in a third row, the pixels include P20, P21, P22, P23, . . . P2*k*; in a fourth row, the pixels include P30, P31, P32, P33, . . . P3*k*; and in a fifth row, the pixels include P40, P41, P42, P43, . . . P4*k*. The array of rows is generally processed in two stages:

Stage 1:

At a pipeline k=1, if the current interpolation point is closer to P11.

$$P21'=(coef01*P01+coef11*P11+coef21*P21+coef31*P31)+SlopeK*(coef02*P02+coef20*P20+coef00*P00+coef22*P22),$$

where the value SlopeK represents the bilinear distance between P11 and P21. Alternatively, if the current interpolation point is closer to P21:

$$P21'=(coef11*P11+coef21*P21+coef31*P31+coef41*P41)+(1-SlopeK)*(coef10*P10+coef32*P32+coef12*P12+coef30*P30).$$

Stage 2:

$$Poutput=coef20*P20'+coef21*P21'+coef22*P22'+coef23*P23',$$

where the coefficient can be any of polyphase FIR (finite impulse response) filter coefficients.

For some embodiments, the interpolation/decimation engine (e.g., the vertical/diagonal scaler 120 in FIG. 1) reads multiple vertical pixels simultaneously. Reading multiple vertical pixels simultaneously generally allows a variety of 2-dimensional image filtering operations that may produce better image quality than a traditional X-direction, followed by Y-direction image filtering operation.

Figure 5:
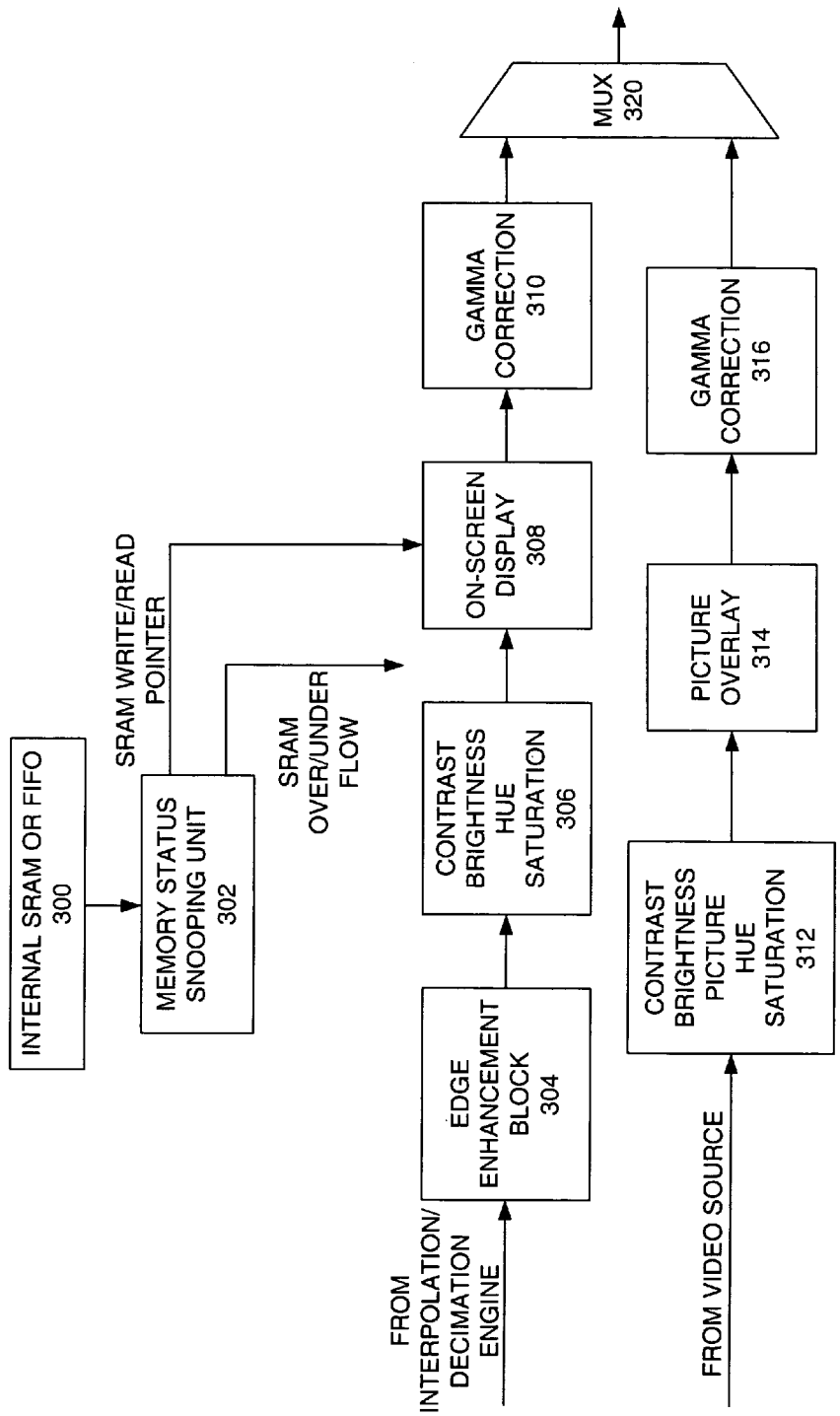
FIG. 5 shows an exemplary diagram of a post-processing circuit.

Referring to FIG. 5, an exemplary diagram is shown illustrating one embodiment of a post-processing circuit (or block). Data from the interpolation/decimation engine (e.g., DEINTPIX) may be provided to an edge enhancement block 304. The edge enhancement block 304 may be configured to enhance image edges. After edge enhancement, data is provided to a contrast, brightness, hue, saturation adjustment block 306. Data may then be provided to an on-screen display (OSD) block 308. Next, the data may be gamma corrected in gamma correction block 310. The output of the gamma correction block 310 may be provided to a multiplexer 320.

The multiplexer 320 may receive data from either the interpolation/decimation engine or an external video source. For example, external video (e.g., from the block 102 in FIG. 1) may be provided to a contrast, brightness, hue, saturation adjustment block 312. The external video data may then be provided to a picture overlay block 314. An output of the block 314 may be gamma corrected in gamma correction block 316. An output of the gamma correction block 316 may be provided to the multiplexer 320.

Figure 6:
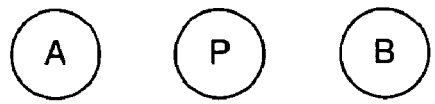
FIG. 6 shows an exemplary diagram of a median filtering operation.

Referring to FIG. 6, an exemplary diagram is shown illustrating a median filter operation. In general, a new (or generated) pixel (e.g., P) may be generated from a pair of neighboring pixels (e.g., A and B) in either a vertical or a horizontal direction. The new pixel P may be generated such that a first neighboring pixel A has a value that is less than a value of the pixel P and a second neighboring pixel B has a value that is greater than the pixel P or the neighboring pixel A has a value that is greater than the pixel P which is greater than the neighboring pixel B. In general, median filtering may be implemented to remove high frequency noise and de-interlacing artifacts. However, median filtering also may remove a true de-interlaced pixel which is not artifact or noise.

Figure 7:
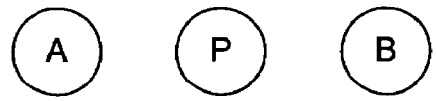
FIG. 7 shows an exemplary diagram of a modified median filtering operation in accordance with a preferred embodiment of the present invention.

Referring to FIG. 7, an exemplary diagram is shown illustrating a modified median filtering operation in accordance with a preferred embodiment of the present invention. A modified median filtering operation in accordance with the present invention may be implemented such that a predetermined threshold is implemented that modifies the values of the neighboring pixels A and B before generating the new pixel P. For example, the newly generated pixel P may be generated such that (i) a value of the pixel P is greater than a value of the neighboring pixel A less the predetermined threshold value TH and less than a value of the neighboring pixel B plus the predetermined threshold value TH or (ii) the value of the newly generated pixel P is less than a value of the neighboring pixel A plus the predetermined threshold value TH and greater than a value of the neighboring pixel B minus the predetermined threshold value TH. In general, the modified median filtering operation implemented with the predetermined threshold TH provides improved performance in comparison to a median filtering alone. In a preferred embodiment, the predetermined threshold value TH may have a value ranging from about 10 to about 20 when pixel values are 8 bits wide.

Figure 8:
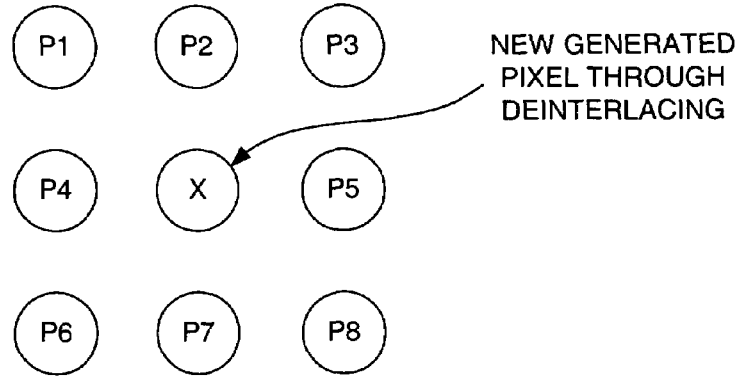
FIG. 8 shows an exemplary diagram of an 8-pixel energy median filtering operation in accordance with a preferred embodiment of the present invention.

Referring to FIG. 8, an exemplary diagram is shown illustrating an energy median filtering operation in accordance with a preferred embodiment of the present invention. In one example, a modified median filtering operation in accordance with the present invention may comprise performing an energy median filtering operation. In one example, the energy median filtering operation may be implemented as an 8 pixel energy median filtering operation. For example, a newly generated pixel X (e.g., generated through a deinterlacing operation) may be filtered using 8 surrounding pixels P1 ... P8. In one example, an energy difference spread (EDM) of the neighboring pixels P1 to P8 may be used to determine whether the newly generated pixel X is classified as (i) artifact/noise or (ii) a deinterlaced pixel.

Figure 9:
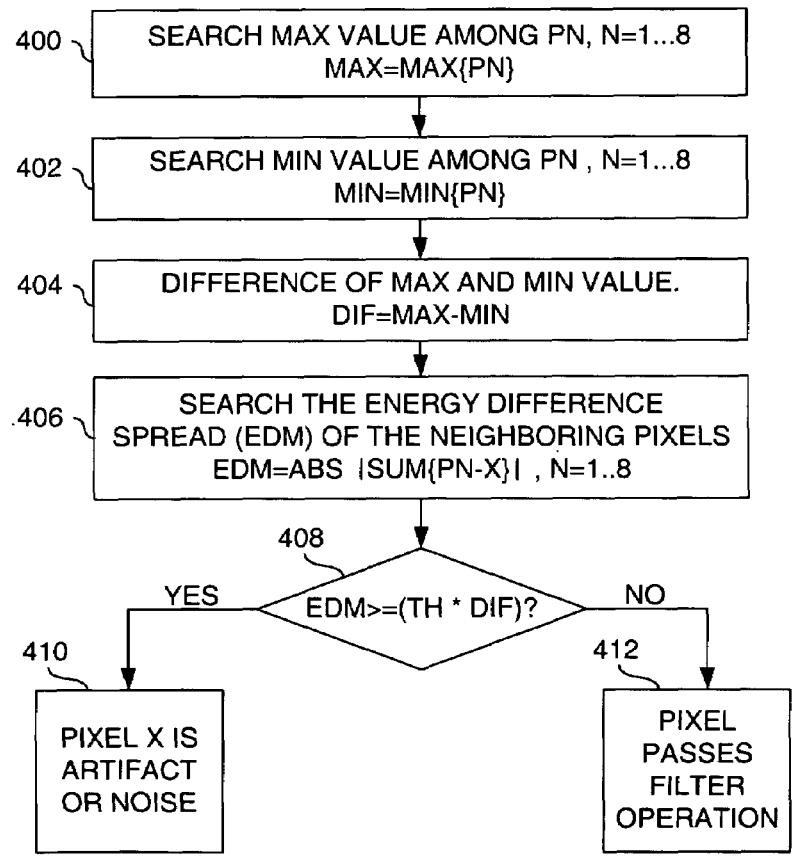
FIG. 9 shows an exemplary flow diagram of a filtering operation in accordance with a preferred embodiment of the present invention.

Referring to FIG. 9, a flow diagram is shown illustrating an energy median filtering process in accordance with a preferred embodiment of the present invention. In one example, an energy median filtering operation in accordance with the present invention may begin by selecting 8 pixels as shown in FIG. 8. A search is performed of the 8 pixels to determine a maximum value among the pixels (e.g., block 400). A search may then be performed to determine a minimum value among the 8 pixels (e.g., block 402). A difference between the maximum and minimum values of the 8 pixels surrounding the newly generated pixel may be determined (e.g., block 404). An energy difference spread (EDM) of the neighboring pixels may be determined (e.g., block 406). In one example, the energy difference spread (EDM) of the neighboring pixels may be determined according to the following equation:

$$EDM = ABS|SUM\{PN-X\}|, N=1 \ldots 8$$

where N represents the pixel-number.

When the energy difference spread of the neighboring pixels has been determined, the energy difference spread may be used to classify whether the pixel X is treated as an acceptable deinterlaced pixel or as artifact or noise (e.g., block 408). For example, when the energy difference spread (EDM) is greater than or equal to the product of a predetermined threshold TH with the difference between the maximum and minimum values of the pixels surrounding the newly generated pixel (e.g., EDM≧TH*DIF), the newly generated pixel may be classified as artifact or noise (e.g., block 410). However, when the energy difference spread (EDM) is less than the product of the predetermined threshold value TH and the difference between the minimum and maximum values (e.g., EDM<TH*DIF), the pixel may be considered to pass the filtering operation (e.g., block 412). In a preferred embodiment, the predetermined threshold TH may have a range from about 3 to about 6. In another preferred embodiment, the predetermined threshold TH may have a value of 5.

It is to be understood that various terms employed in the description herein are interchangeable. Accordingly, the above description of the invention is illustrative and not limiting. Further modifications will be apparent to one of ordinary skill in the art in light of this disclosure.

The invention has been described in terms of specific examples which are illustrative only and are not to be construed as limiting. The invention may be implemented in digital electronic circuitry or in computer hardware, firmware, software, or in combinations of them.

The apparatus of the invention may be implemented in a computer program product tangibly embodied in a machine-readable storage device for execution by a computer processor; and method steps of the invention may be performed by a computer processor executing a program to perform functions of the invention by operating on input data and generating output. Suitable processors include, by way of example, both general and special purpose microprocessors. Storage devices suitable for tangibly embodying computer program instructions include all forms of non-volatile memory including, but not limited to: semiconductor memory devices such as EPROM, EEPROM, and flash devices; magnetic disks (fixed, floppy, and removable); other magnetic media such as tape; optical media such as CD-ROM disks; and magneto-optic devices. Any of the foregoing may be supplemented by, or incorporated in, specially-designed application-specific integrated circuits (ASICs) or suitably programmed field programmable gate arrays (FPGAs).

While the invention has been particularly shown and described with reference to the preferred embodiments thereof, it will be understood by those skilled in the art that various changes in form and details may be made without departing from the spirit and scope of the invention.

The invention claimed is:

1. A method for rendering an object on a display screen, comprising the steps of:
    buffering a plurality of pixels in a plurality of line buffers;
    determining a boundary of the object based on the buffered pixels;
    determining a direction of the boundary;
    testing if a pixel in the line buffers is in motion and applying one of a plurality of filter coefficients if the pixel is in motion, wherein the plurality of filter coefficients define a modified median filter having a predetermined threshold; and
    interpolating a new pixel in the direction of the boundary through a combination of de-interlacing and vertical/diagonal scaling operations.

2. The method according to claim 1, further comprising the step of performing either intra-frame de-interlacing or inter-frame de-interlacing based upon whether a pixel in the line buffers is in motion.

3. The method according to claim 1, wherein the step of interpolating the new pixel comprises de-interlacing the buffered pixel data and vertically and diagonally scaling the de-interlaced pixel data.

4. The method according to claim 1, wherein said predetermined threshold has a value ranging from about 10 to about 20 when said pixels are 8-bits wide.

5. A method for rendering video data on a display screen, comprising the steps of:

applying a modified median filter having a predetermined threshold to moving pixels;
horizontally scaling the video data;
de-interlacing the horizontally scaled video data; and
vertically and diagonally scaling the de-interlaced video data.

6. The method according to claim 5, wherein said modified median filter is configured to perform energy median filtering.

7. The method according to claim 5, wherein the step of applying the modified median filter further comprises the steps of:
determining a maximum value of a plurality of pixels;
determining a minimum value of said plurality of pixels;
determining a difference between said maximum value and said minimum value; and
determining an energy difference spread of said plurality of pixels.

8. The method according to claim 7, further comprising the step of:
determining whether a generated pixel is artifact or noise based on said energy difference spread, said difference and said predetermined threshold.

9. The method according to claim 8, wherein said predetermined threshold has a value ranging from about 3 to about 6.

10. The method of claim 5, wherein the step of de-interlacing further comprises performing either intra-frame de-interlacing or inter-frame de-interlacing.

11. The method according to claim 6, further comprising the step of adaptive edge motion processing.

12. An apparatus for processing video data, comprising:
a motion detector configured to detect whether pixels are in motion and apply a modified median filter having a predetermined threshold to moving pixels; and
a de-interlacer coupled to the motion detector, wherein said de-interlacer is configured to integrate a 2D de-interlacing operation, a 3D de-interlacing operation, a vertical/diagonal interpolation/decimation operation and a modified median filtering operation.

13. The apparatus according to claim 12, further comprising a data format converter circuit coupled to the de-interlacer and configured to convert between two or more formats selected from the group consisting of YUV, YCbCr and RGB.

14. The apparatus according to claim 12, further comprising
a horizontal scaler coupled to the motion detector; and
a video memory coupled to an output of the horizontal scaler and an input of the motion detector.

15. The apparatus according to claim 12, wherein the de-interlacer comprises a 2D de-interlacer and a 3D de-interlacer.

16. The apparatus according to claim 12, wherein the de-interlacer is configured to processes one or more types of data selected from the group consisting of intra-frame data and inter-frame data.

17. The apparatus according to claim 12, further comprising a video buffer coupled to the de-interlacer.

18. The apparatus according to claim 12, further comprising a plurality of first-in first-out (FIFO) buffers coupled to the de-interlacer.

19. The apparatus according to claim 12, wherein said modified median filter is configured to perform energy median filtering.

20. The apparatus according to claim 12, further comprising a horizontal scaler coupled to an output of the de-interlacer.

* * * * *